Feb. 28, 1933.    C. H. H. LAMBERTY    1,899,621
PROCESS OF PRODUCING COMPOSITE SHEETS OF SAFETY GLASS
Filed Dec. 22, 1930
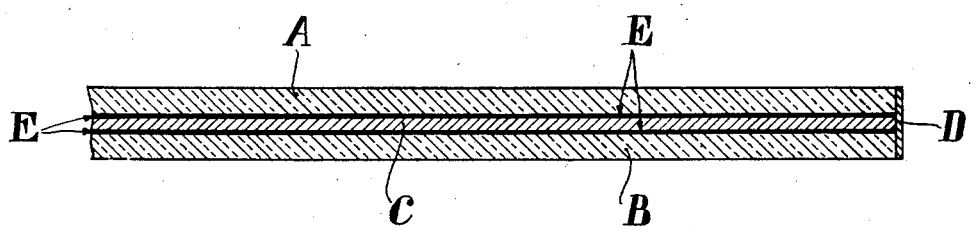
INVENTOR.
CONRAD HUBERT HERRMANN LAMBERTY.
ATTORNEY.

Patented Feb. 28, 1933

1,899,621

UNITED STATES PATENT OFFICE

CONRAD HUBERT HERRMANN LAMBERTY, OF LONDON, ENGLAND, ASSIGNOR OF ONE-HALF TO EDWARD BERKELEY CHERLTON WOODBURY, OF LONDON, ENGLAND

PROCESS OF PRODUCING COMPOSITE SHEETS OF SAFETY GLASS

Application filed December 22, 1930, Serial No. 504,163, and in Great Britain July 22, 1930.

The invention is concerned with the manufacture of what is commonly called safety-glass, that is to say a composite sheet composed of glass sheets with an intermediate layer tending to preventing splintering of the glass in case of fracture.

An intermediate layer of gelatine has been used in some cases, and I in my invention use a sheet of gelatine.

For uniting the sheet of gelatine with the glass sheets I coat the glass sheets, as by dipping, with a mixture of pure glycerine and acetic acid, without admixture of isinglass or gum such as has heretofore been introduced where a composition containing glycerine and acetic acid was used and after bringing the sheets together I apply pressure to the assembled sheets, as by means of a roller press, with rubber rollers, through which the composite sheet is passed.

The edges of the composite sheet may be sealed by applying thereto an alcoholic solution of collodion.

A portion of a composite sheet according to the invention is shown in section in the accompanying drawing, in which A and B represent respectively the two glass sheets, and C represents the gelatine sheet, D being the thin coating sealing the edge. The films of binding material attaching the gelatine sheet to the glass sheets are marked E.

The proportions in which the glycerine and acetic acid are used vary according to climatic conditions at the time of manufacture, the proportion of acetic acid ranging in general from about 15% to about 25% by weight.

The glycerine should be of high grade as regards chemical purity.

The gelatine sheet, transparent or coloured, may be made by any of the current commercial processes by which gelatine sheeting is prepared, for example, for packing purposes, but it should of course be free from the coating or varnish commonly applied to gelatine sheeting intended for packing purposes.

The gelatine sheet may be decorated or printed if desired, as for example for advertising purposes.

What I claim as my invention and desire to secure by Letters Patent of the United States is:—

The process of producing a composite sheet of safety glass, which consists in coating two glass sheets with a mixture consisting as to not less than 15% and not more than 25% of acetic acid, and as to the remainder of glycerine, placing between the coated glass sheets a sheet of solid gelatine, and uniting the three sheets by pressure.

CONRAD HUBERT HERRMANN LAMBERTY.